Figure 1:
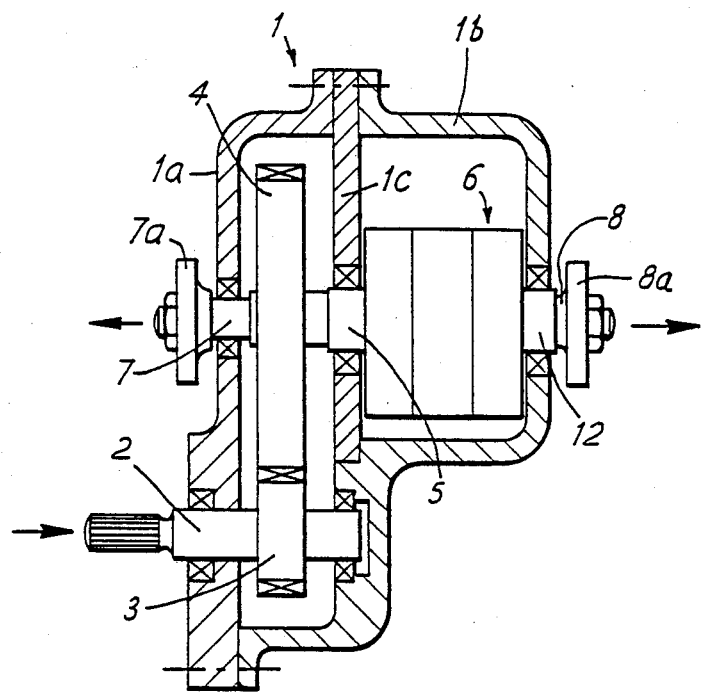

United States Patent [19]

Russell

[11] Patent Number: 4,821,603
[45] Date of Patent: Apr. 18, 1989

[54] TORQUE-APPORTIONING DIFFERENTIAL MECHANISM FOR MOTOR VEHICLES

[75] Inventor: Peter J. Russell, Lichfield, England

[73] Assignee: Knight-Mechadyne Limited, Kirtlington, England

[21] Appl. No.: 71,227

[22] PCT Filed: Jul. 31, 1986

[86] PCT No.: PCT/GB86/00462
§ 371 Date: May 6, 1987
§ 102(e) Date: May 6, 1987

[87] PCT Pub. No.: WO87/00900
PCT Pub. Date: Feb. 12, 1987

[30] Foreign Application Priority Data

Jul. 31, 1985 [GB] United Kingdom ............... 8519286

[51] Int. Cl.[4] ........................................... F16H 1/38
[52] U.S. Cl. ........................................ 74/715; 74/710
[58] Field of Search ............... 74/711, 710.5, 714, 74/715

[56] References Cited

U.S. PATENT DOCUMENTS

| | | | |
|---|---|---|---|
| 1,195,314 | 8/1916 | Williams | 74/715 |
| 1,262,833 | 3/1918 | Nogrady | 74/715 |
| 2,559,916 | 7/1951 | Gleasman | 74/715 |
| 2,666,343 | 1/1954 | Casa-Massa | 74/715 |
| 2,898,779 | 8/1959 | Mickelson | 74/715 |
| 3,095,761 | 7/1963 | Hilado | 74/715 |
| 3,364,789 | 1/1968 | Whitfield | 74/675 |
| 4,495,835 | 1/1985 | Gleasman | 74/715 |
| 4,512,211 | 3/1985 | Stritzel | 74/714 X |
| 4,667,535 | 5/1987 | Knight | 74/715 |

FOREIGN PATENT DOCUMENTS

| | | | |
|---|---|---|---|
| 0148641 | 7/1985 | European Pat. Off. | 74/715 |
| 1156754 | 5/1958 | France | 74/710.5 |
| 3239 | of 1908 | United Kingdom | 74/714 |
| 938523 | 10/1963 | United Kingdom | 74/710.5 |
| 986278 | 3/1965 | United Kingdom . | |

*Primary Examiner*—Dwight G. Diehl
*Attorney, Agent, or Firm*—Thomas & Kennedy

[57] ABSTRACT

Limted slip differential mechanism for dividing input torque, applied to a splined sleeve (5) unequally between a front propeller shaft (7) and a rear propeller shaft (8) comprises a casing (10) (carrying the sleeve 5) in which are mounted for rotation about their respective axes a wormwheel (21ad) and front and rear worms (18D, 18A) meshing with opposite sides of the wormwheel (21ad) and being of sufficient length also to mesh with helical output gears (15,16) on the respective shafts (7,8). The rear output gear (16) is larger than the front output gear (15) so the torque is divided between the output gears in the ratio of their pitch circle diameters in the absence of substantial relative rotation while normal traction is maintained, but with limited slip if potential loss of traction occurs.

3 Claims, 3 Drawing Sheets

TORQUE-APPORTIONING DIFFERENTIAL MECHANISM FOR MOTOR VEHICLES

The present invention relates to differential mechanisms for apportioning different driving torques between drive shafts in a motor vehicle.

According to the present invention, there is provided a differential mechanism comprising a gear carrier having means for mounting the gear carrier for rotation about an axis thereof, first and second output gears each being rotatable about its axis which coincides with the axis of the gear carrier, and at least one gear train comprising meshing toothed elements rotatably mounted in the gear carrier, the gear train meshing with both output gears to establish a drive path from one output gear to the other which includes in series along the drive path, in either order, both a worm-to-wormwheel and a wormwheel-to-worm mesh, the pitch circle diameters of the mesh between the output gears and the gear train being unequal.

Such an arrangement divides input torque applied to the gear carrier between the two output gears in proportion to the pitch circle diameters of the respective gears while at the same time forming a limited slip differential. Such a mechanism is particularly suitable for dividing the power from the gearbox of a four-wheel drive vehicle where, in view of the effective weight transference towards the rear axle during acceleration, it may be desirable, for example, to transmit one third of the available torque to the front axle and two thirds to the rear axle.

Figure 2:
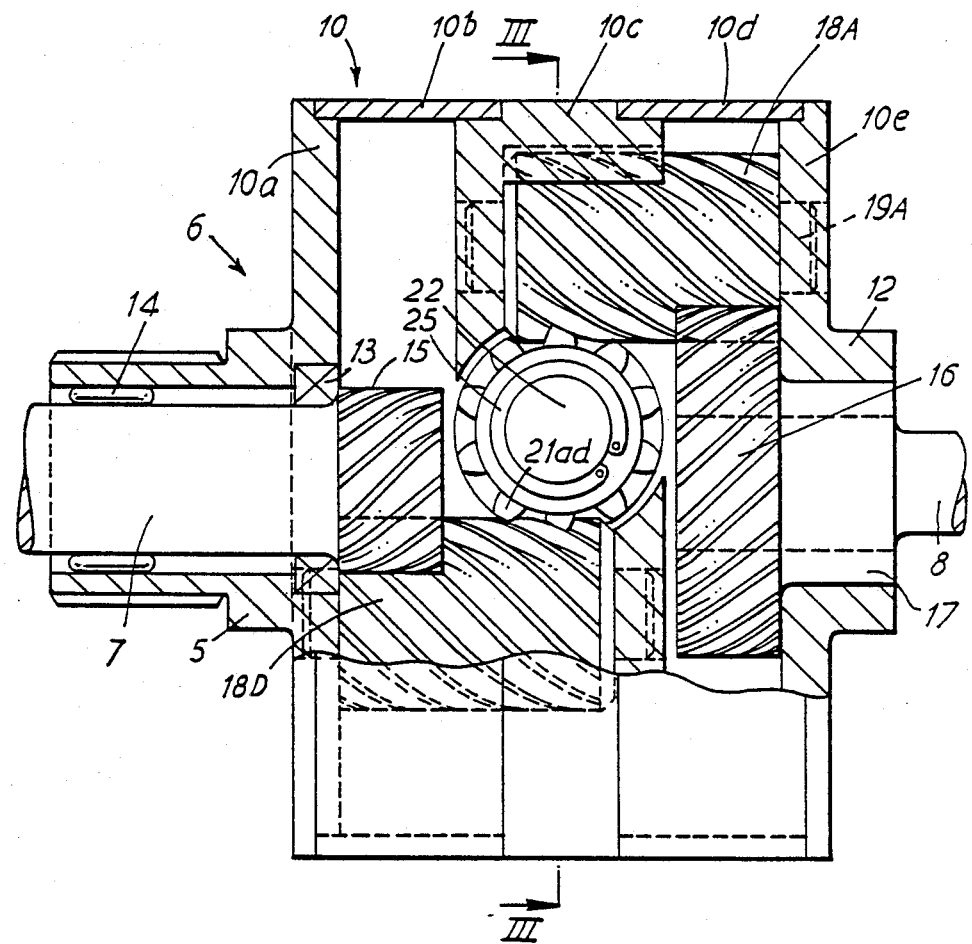
Figure 3:
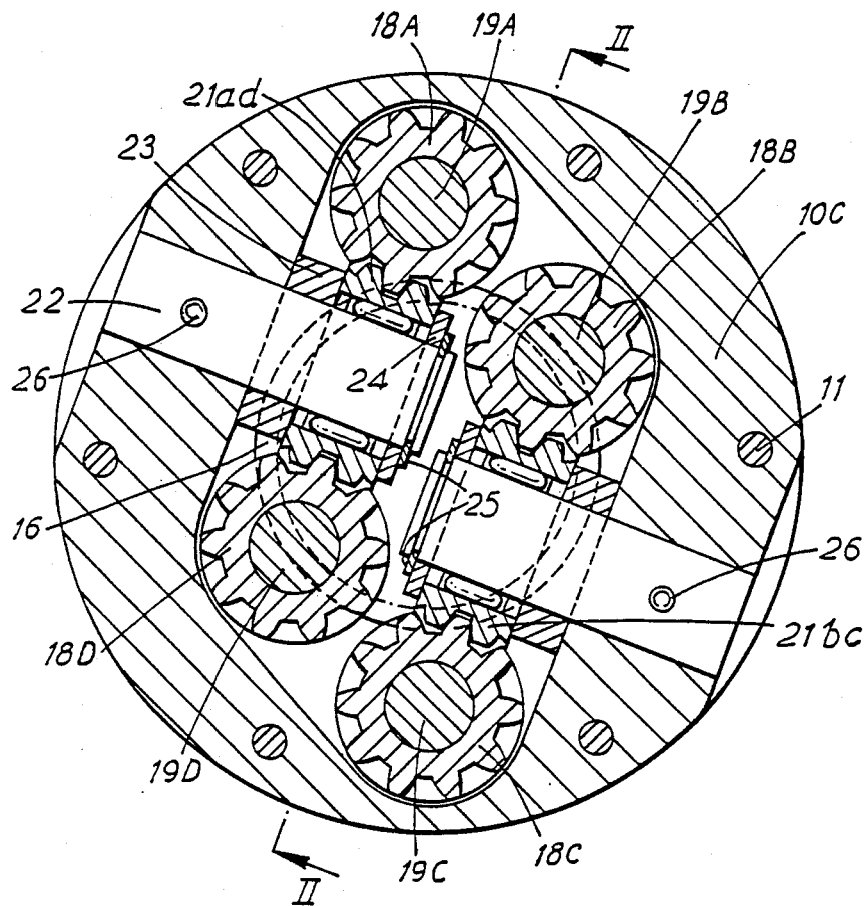

An embodiment of the invention will now be described by way of example with reference to the accompanying drawings, in which:

FIG. 1 is an axial sectional view, longitudinally of the vehicle, of a transfer gearbox for dividing input torque between front and rear propeller shafts, FIG. 2 shows the differential mechanism of FIG. 1 also in axial section but on an enlarged scale, and FIG. 3 is a cross section on the line III—III of FIG. 2.

The transfer gearbox shown in FIG. 1 has a casing 1 comprising two outer casing parts 1a and 1b and an internal diaphragm wall 1c secured together by bolts (not shown). An input shaft 2 which in use is driven by the output of the vehicle gearbox (not shown) is mounted in bearings in the casing parts 1a and 1c and carries a gear 3 meshing with a further transfer gear 4 which is splined onto an extension sleeve 5 of a differential gear mechanism 6. A front output shaft 7 and a rear output shaft 8 are mounted in bearings respectively in the casing parts 1a and 1b and carry respective flanges 7a and 8a by which they may be coupled to a front propeller shaft and a rear propeller shaft (not shown) for driving front and rear axles respectively of a four-wheel drive vehicle.

The differential gear mechanism 6 is shown in detail in FIGS. 2 and 3. The differential mechanism 6 comprises a generally cylindrical gear carrier 10 comprising a front plate 10a formed integrally with the extension sleeve 5, a first tubular spacer 10b, a central body 10c, a second tubular spacer 10d and a rear end plate 10e, all of which are clamped together with a set of tie bolts 11 (FIG. 3). The back plate 10e is formed with a rearwardly projecting sleeve portion 12 by means of which it is supported in the bearing in the casing part 1a.

The front output shaft 7 is supported by bearings 13 and 14 in the extension sleeve 5 and is formed at its rear end with an integral helical gear 15. The front end of the rear output shaft 8 has splined onto it an output helical gear 16 of larger pitch circle diameter than the front output gear 15 (but of the same module and correspondingly larger number of teeth). The rear output gear 16 has a cylindrical extension 17 supported by means of a plain bearing in the extension sleeve 12.

Four identical worm gear members 18A, 18B, 18C and 18D are rotatably mounted on respective fixed pins 19A–19D which are longer than the worm gear members and are all parallel to the common axis of the output shaft 7 and 8 and of the gear carrier housing 10. The pins 19B and 19D have their forward ends supported in the front plate 10a and their rear ends in the central block 10c.

The rear end portions of the other two worm gear members 18A and 18C mesh with the rear output gear 16. Their support pins 19A and 19C have their front ends supported in the central body 10c and their rear ends in the rear end plate 10e. Since the pitch circle diameter of the rear output gear 16 is greater than that of the front output gear 15, the pins 19A and 19C are further from the common axis of the machine than the pins 19B and 19D.

Two identical wormwheels 21ad and 21bc are rotatably mounted on pins 22 by means of needle roller bearings 23. The wormwheel 21ad meshes with the front end portion of the worm gear member 18a and the rear end portion of the worm gear member 18D. The wormwheel 21 of bc meshes with the rear end portion of the worm gear member 18B and with the front end portion of the worm gear member 18C. The wormwheels are maintained in the correct axial position on their pins 22 by means of appropriate spacer rings 23 and 24, the latter being retained by circlips 25. The pins 22 are secured in the central body 10c by spring pins 26.

As can be seen in FIG. 3, the two pins 22 are offset from each other as the result of the difference in the pitch circle diameters of the output gears 15 and 16.

Thus, the worm 18A, the wormwheel 21D and the worm 18D form a drive path between the rear output gear 16 and the front output gear 15 and this drive path involves, in series, both a worm-to-wormwheel mesh and a wormwheel-to-worm mesh. A duplicate path is formed by the other two worms and their wormwheel 21bc.

In operation, the arrangement described above not only divides the input torque between the front and rear output shafts in the ratio of the pitch circle diameters of the front and gear wheels 15 and 16, but also the worm gear members 18 and their wormwheels 21 form a limited slip differential. Thus, when the vehicle to which the differential mechanism is fitted is travelling with the front and rear propeller shafts turning at the same speed, there is no relative rotation of any of the internal components of the differential mechanism. In particular, the worms and wormwheels do not rotate about their own axes and the output gears turn en bloc with the gear carrier housing 10. The input torque applied to the housing from the gearbox output is transferred through the central block 10c and the pins 22 to the wormwheels 21 and thence through the mesh points of the wormwheels with the worms and thence to the output gears 15 and 16 and their output shafts. In the embodiment shown in the drawings, the pitch circle diameter of the front output gear 15 is one half of that of the rear output gear 16 so that the driving torque applied to the rear wheels is twice that applied to the front wheels. This is appropriate for a typical vehicle in view of the effective transfer of weight to the rear wheels when accelerating or hill-climbing. Clearly, other ratios are possible to suit specific vehicle requirements.

If one output shaft should turn at a slightly different speed from that of the other while the correct relative torque levels are maintained, such as would occur when cornering or with variations in tire diameters, relative rotation of the internal gears is not resisted and a true differential action is maintained.

If, however, one end of the vehicle should lose traction as a result of one wheel skidding or leaving the ground, for example, then the output shaft associated with that end of the vehicle will try to rotate faster than the other, while offering a lower resistive torque. This will result in incipient relative rotation of the worms and wormwheels about their own axis. Since the worm-to-wormwheel mesh and the wormwheel-to-worm mesh both involve substantial amounts of sliding, the transmission of torque is comparatively inefficient and the rotation is effectively resisted and a degree of slip limitation is imposed. The ratio of output shaft torques imparted by the limited slip action (the torque bias ratio) is different depending on which of the two shafts is tending to slip, as a result of the difference in the output gear sizes.

In an alternative embodiment (not shown), the wormwheels are of reduced diameter and mesh directly one with each of the output gears, being arranged tangentially to the respective output gears. These wormwheels carry spur gears which mesh with each other to ensure contra-rotation of the two wormwheels if the output gears should rotate at different speeds.

I claim:

1. A limited slip differential mechanism for apportioning input torque applied to the mechanism between first and second output gears, said mechanism comprising a gear carrier mountable for rotation about an axis of the carrier;
    a pair of diametrically opposed first worm members mounted for rotation relative to the carrier with their axes parallel to the carrier axis;
    a pair of diametrically opposed second worm members mounted for rotation relative to the carrier with their axes parallel to the carrier axis;
    a first output gear wheel coaxial with said carrier axis and meshing with said first worm members;
    a second output gear wheel coaxial with said carrier and meshing with said second worm members;
    a pair of idler worm wheels each mounted for rotation relative to the carrier about an axis extending substantially perpendicular to the carrier axis;
    each of said first worm members being individually coupled to a single one of said second worm members by a respective one of said idler worm wheels thereby establishing a drive path from one output gear to said other output gear, the pitch circle diameters of the mesh between said output gears and respective ones of said first and second worm members being unequal and the axes of said idler worm wheels being parallel to but offset from each other.

2. A differential mechanism according to claim 1, wherein the drive train comprises a wormwheel mounted in the carrier for rotation about an axis skew to the axis of the carrier and two worm members meshing with the wormwheel on opposite sides thereof, the worm members having toothed portions meshing with each of the output gears.

3. A differential mechanism according to claim 2, wherein the said toothed portions of the worm members are formed by continuations of the worm and the output gears are correspondingly helically toothed.

* * * * *